United States Patent [19]

Coultas et al.

[11] Patent Number: 5,131,680
[45] Date of Patent: Jul. 21, 1992

[54] INFLATOR ASSEMBLY

[75] Inventors: Terry Coultas, Canyon Country, Calif.; William McLeod, Roseville; Paul Wipasuramonton, Rochester, Mich.; James R. Hocking, Sterling Heights, Mich.

[73] Assignee: TRW Vehicle Safety Systems Inc., Lyndhurst, Ohio

[21] Appl. No.: 671,947

[22] Filed: Mar. 19, 1991

[51] Int. Cl.⁵ .............................................. B60R 21/26
[52] U.S. Cl. ................................. 280/737; 280/741; 222/3
[58] Field of Search ....................... 280/736, 737, 741; 222/3

[56] References Cited

U.S. PATENT DOCUMENTS

| | | | |
|---|---|---|---|
| Re. 28,624 | 11/1975 | Lewis et al. | 423/262 |
| 3,723,205 | 3/1973 | Scheffee | 149/19.91 |
| 3,731,843 | 5/1973 | Anderson, Jr. | 222/3 |
| 3,877,721 | 4/1975 | Brown, Jr. | 222/5 |
| 3,966,226 | 6/1976 | Roth | 280/737 |
| 4,981,534 | 1/1991 | Scheffee | 149/19.91 |
| 5,022,674 | 6/1991 | Frantom et al. | 280/737 |
| 5,033,772 | 7/1991 | Frantom et al. | 280/737 |
| 5,060,974 | 10/1991 | Hamilton et al. | 280/737 |
| 5,076,607 | 12/1991 | Woods et al. | 280/737 |

Primary Examiner—Kenneth R. Rice
Attorney, Agent, or Firm—Tarolli, Sundheim & Covell

[57] ABSTRACT

An inflator assembly inflates a vehicle occupant restraint. The inflator assembly includes a container which stores gas under pressure. A body of an ignitable pyrotechnic material is disposed within the container. An igniter assembly is actuatable in response to being struck to ignite the body of pyrotechnic material. An actuator assembly is provided to release the stored gas from the container and to actuate the igniter assembly. The actuator assembly includes a pyrotechnic which moves an actuator member to rupture a portion of the container and to strike the igniter assembly. Upon actuation of the igniter assembly, the pyrotechnic material is ignited and begins to burn. During initial burning of the pyrotechnic material, an orifice plate restricts a flow of combustion products to promote burning of the pyrotechic material. During continued burning of the pyrotechnic material, the flow of combustion products enlarges the size of the orifice in the orifice plate to reduce the restriction to the flow of combustion products. The combustion products heat the gas in the container to increase the fluid pressure in the container.

38 Claims, 6 Drawing Sheets

INFLATOR ASSEMBLY

BACKGROUND OF THE INVENTION

The present invention relates to a new and improved inflator assembly for inflating a vehicle occupant restraint, such as an air bag.

An inflator assembly for inflating an air bag is disclosed in U.S. Pat. No. 3,723,205. This inflator assembly includes a container which holds air under pressure. When the air bag is to be inflated, a squib is electrically actuated to ignite a gas generating material. As the gas generating material burns, the pressure in the container is increased due to the gases and heat provided by burning the gas generating material. When a predetermined pressure is reached, a burst disk is ruptured to enable gas to flow from the container to the air bag.

SUMMARY OF THE INVENTION

The present invention is a new and improved inflator assembly for inflating a vehicle occupant restraint, such as an air bag. The inflator assembly includes a container of gas under pressure. A body of ignitable pyrotechnic material (main pyrotechnic material) is disposed within the container. An igniter assembly is actuatable to ignite the heat generating material. As the main pyrotechnic material is burned, it heats the gas in the container to increase the fluid pressure in the container. In addition, it partially generates nontoxic and non-corrosive gas, to supplement the stored primary inflation gas.

An actuator assembly is provided to release the stored gas from the container and to actuate the igniter assembly to effect ignition of the main pyrotechnic material. The actuator assembly includes a pyrotechnic material which is ignited by applied current from a vehicle firing circuit. This circuit is activated upon the occurrence of sudden vehicle deceleration. Upon ignition of the pyrotechnic material, an actuator member is moved to rupture a portion of the container and to strike the igniter assembly. When the actuator member ruptures the container, gas stored in the container flows into the vehicle occupant restraint. When the actuator member strikes the igniter assembly, the igniter assembly is actuated to effect ignition of the main pyrotechnic material, which heats the gas in the container and adds generated gas to supplement the gas in the container.

The main pyrotechnic material is preferably located in a housing in the container. During initial burning of the main pyrotechnic material, a relatively small orifice in an orifice plate restricts the flow of combustion products from the housing to promote burning of the main pyrotechnic material. As the main pyrotechnic material continues to burn, the flow of combustion products enlarges the orifice to reduce the restriction to the flow of combustion products.

BRIEF DESCRIPTION OF THE DRAWINGS

The foregoing and other objects and features of the present invention will become more apparent to one skilled in the art upon a consideration of the following description of the invention and the accompanying drawings, in which:

FIG. 10 is a fragmentary sectional view, generally similar to FIG. 3, of a second modified embodiment of an inflator assembly constructed in accordance with the present invention.

DESCRIPTION OF PREFERRED EMBODIMENTS OF THE INVENTION

General Description

Figure 1:
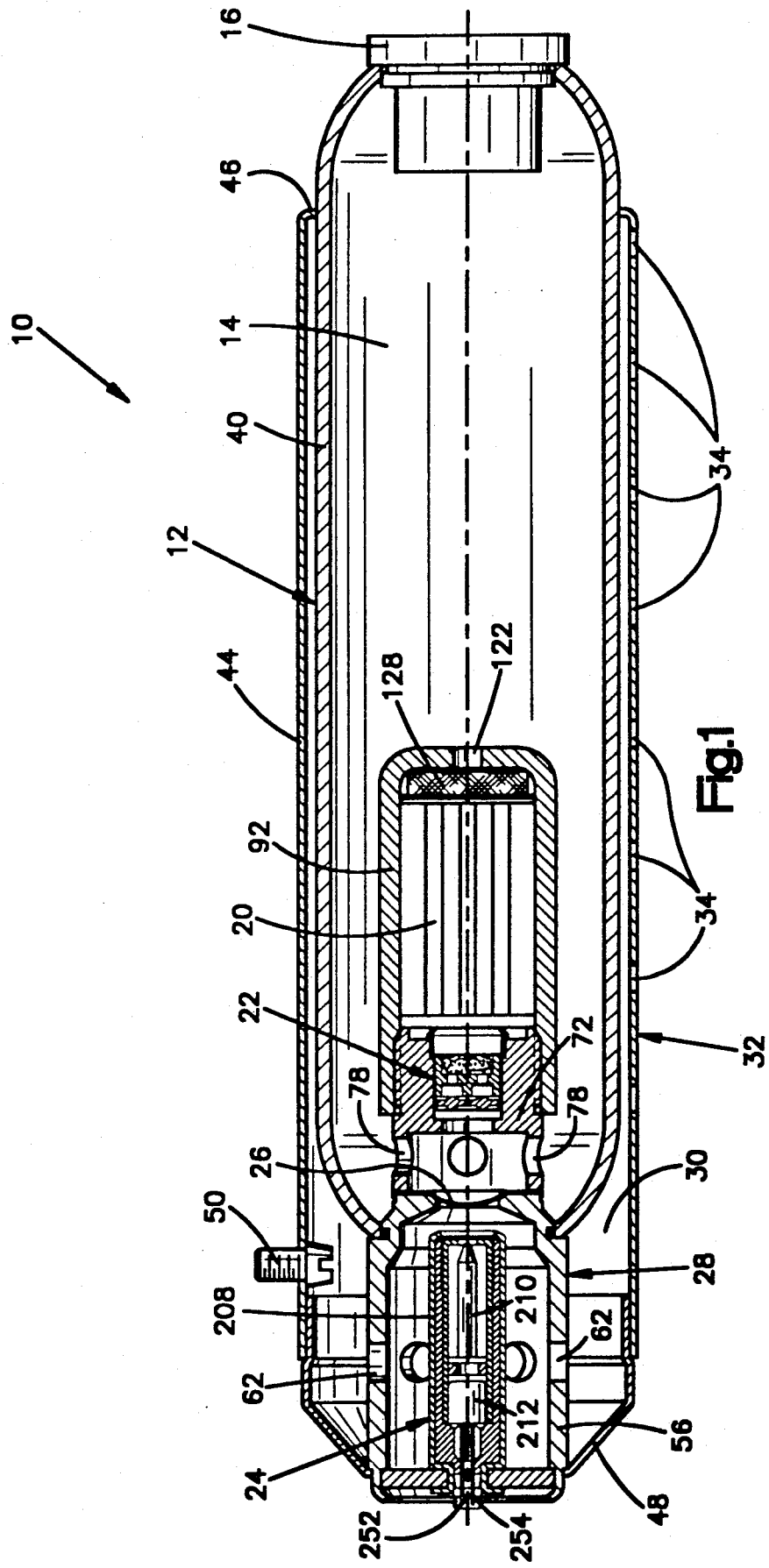
FIG. 1 is a sectional view of an inflator assembly which is constructed in accordance with the present invention.

An inflator assembly 10 (FIG. 1) is used to inflate a vehicle occupant restraint, such as an air bag. The inflator assembly 10 includes a generally cylindrical container 12, a generally cylindrical diffuser 32, and a manifold assembly 28. The manifold assembly 28 is secured to one end of the container 12 by a friction weld 13 and projects both axially into and axially away from the container. The diffuser 32 is larger in diameter than the container 12 and is mounted to encircle both the container and the manifold assembly. The diffuser 32 also extends substantially the entire length of the manifold assembly 28 and a significant portion of the length of the container 12.

The container 12 defines a generally cylindrical chamber 14. The chamber 14 is filled with gas under pressure which is introduced into the chamber through an end cap 16. The end cap 16 extends through an opening at an end of the container 12 opposite from the manifold assembly 28 and is connected to the container 12 by a friction weld 17. The end cap 16 includes a passage (not shown) through which the gas is conducted into the chamber 14. Once the chamber 14 has been filled with gas at a desired pressure, the passage is closed. The end cap 16 also includes a conventional pressure switch (not shown) from which gas pressure in the chamber 14 can be monitored to alert a passenger in a vehicle if the pressure in the chamber 14 drops below a set pressure.

The stored gas is preferably argon. The argon gas is preferably stored in the container 12 at a pressure of approximately 2,000 to 3,500 psi. The container 12 could be used, however, to store other gases at different pressures. For example, the container 12 could be used to store air or nitrogen.

The container 12 includes a generally cylindrical one-piece steel wall 40 which defines the chamber 14. The one-piece steel wall 40 may have a length of approximately 230 millimeters, an outside diameter of approximately 59 millimeters, and a thickness of approximately 2.5 millimeters. It should be understood that the foregoing specific dimensions for the wall 40 have been set forth herein for purposes of clarity of description and it is contemplated that the inflator assembly 10 may be constructed with dimensions and materials which are substantially different from the foregoing.

The diffuser 32 is mounted on the outside of the container 12. The diffuser 32 includes a cylindrical diffuser tube 44 having an annular, radially inwardly directed lip 46 at one end. The lip 46 tightly engages a cylindrical outer side surface of the wall 40. An end cap 48 is welded to the end of the diffuser tube 44 opposite from the inturned lip 46. The end cap 48 is connected to an outer end portion of the manifold assembly 28. A mounting stud 50 is connected with the diffuser tube 44 adjacent the end cap 48. The mounting stud 50 is used to mount the inflator assembly 10 to a reaction can which can be mounted at a desired location in a vehicle.

The manifold assembly 28 extends through the wall 40 of the container 12 at the end of the container opposite the end cap 16. The portion of the manifold assembly 28 within the container 12 supports a body 20 of ignitable pyrotechnic material and an igniter assembly 22. The igniter assembly 22 is actuated to ignite the body 20 of pyrotechnic material. The portion of the manifold assembly outside the container 12 supports an actuator assembly 24. Between the actuator assembly 24 and the igniter assembly 22 is a burst disk 26 which seals the container 12.

Upon the sensing of sudden vehicle deceleration, the actuator assembly 24 is actuated to release the stored gas from the chamber 14 and to actuate the igniter assembly 22. When actuated, the actuator assembly 24 ruptures the metal burst disk 26 to release the stored gas from the chamber 14. Thereafter, the actuator assembly 24 actuates the igniter assembly 22 to ignite the body 20 of pyrotechnic material. As the body 20 of pyrotechnic material burns, the gas in the chamber 14 is heated and added to by the hot gases produced by the combustion of the body of heat generating material to increase the pressure of the gas.

Upon rupturing of the burst disk 26, gas flows from the chamber 14 through the manifold assembly 28. The gas flows from the manifold assembly 28 into a chamber 30 formed by the diffuser 32 and the outer walls of the manifold assembly and the container 12. The diffuser 32 has openings 34 through which gas is directed to the air bag.

Manifold Assembly

The manifold assembly 28 (FIG. 2) includes a generally cylindrical metal manifold plug 56 which is disposed partially outside of the container 12. The manifold plug 56 is hollow and has a generally cylindrical interior cavity 58. Circular outlet openings 62 are disposed in a circular array in a cylindrical side wall 64 of the manifold plug 56. One end of the manifold plug 56 extends through the container wall 40 from outside of the container 12 and is friction welded to the wall 40 at the weld 13.

The burst disk 26 extends across a circular opening 60 at the end of the manifold plug 56 which is presented to the interior of the container 12. The burst disk 26 is secured to the manifold plug 56 and blocks a flow of gas from the chamber 14 until the burst disk is ruptured by the actuator assembly 24. The burst disk 26 has a circular domed or bulged central portion 260. The central portion 260 is preferably divided into six equal segments by score lines which extend radially outwardly from the center of the burst disk. When the burst disk 26 is ruptured, the segments will tend to flatten axially outwardly against a frustoconical inner side surface 262 of the manifold plug 56 and form a relatively large opening in the burst disk 26.

The outer end of the manifold plug 56 is closed by a circular end wall 68. The actuator assembly 24 is mounted on the end wall 68. The end wall 68 supports the actuator assembly 24 with its longitudinal central axis coincident with central axes of the manifold plug cavity 58, the circular opening 60, and the burst disk 26. The diameter and length of the actuator assembly 24 are sufficiently smaller than the length and diameter of the cavity 58 that gas can flow from the chamber 14 and through the cavity 58 to the openings 62 when the burst disk 26 is ruptured.

Figure 2:
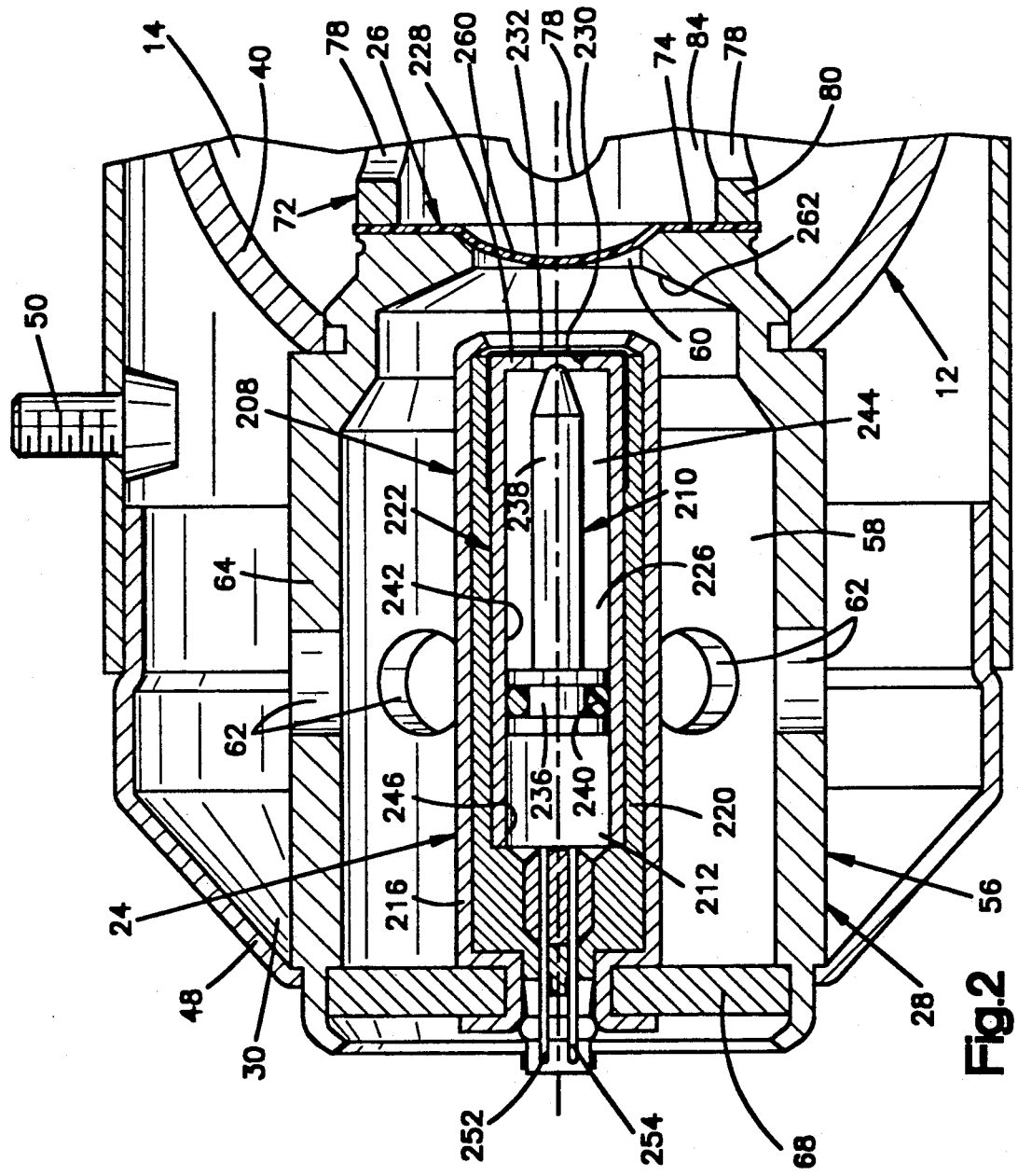
FIG. 2 is an enlarged fragmentary sectional view of a portion of the inflator assembly of FIG. 1.

The manifold assembly 28 also includes a hollow cylindrical metal igniter holder 72 (FIGS. 2 and 3) which is coaxial with the manifold plug 56 and is disposed in the container 12. The igniter holder 72 is tungsten inert gas (TIG) welded to the burst disk 26 and thus to the inner end of the manifold plug 56 (FIG. 2). The circular burst disk 26 has a flat annular rim portion 74 which extends between the inner end of the manifold plug 56 and the outer end of the igniter holder 72. The manifold plug 56, igniter holder 72 and rim portion 74 of the burst disk 26 are all tungsten inert gas welded together to form the unitary manifold assembly 28.

A plurality of circular inlet openings 78 (FIGS. 2 and 3) are arranged in a circular array in a side wall 80 of the igniter holder 72. The openings 78 provide fluid communication between the chamber 14 and a generally cylindrical cavity 84 in the igniter holder 72. The burst disk 26 blocks fluid flow from the cavity 84 into the manifold plug 56 until the burst disk is ruptured by the actuator assembly 24.

The igniter assembly 22 (FIG. 3) is mounted in a cylindrical chamber 86 formed in the end of the igniter holder 72 opposite the burst disk 26. The chamber 86 is connected in fluid communication with the chamber 84 through a circular opening 88. The chamber 86 and circular opening 88 are coaxial with the burst disk 26 (FIG. 2) and the actuator assembly 24.

Main Pyrotechnic Material

A generally cylindrical metal housing 92 (FIG. 3) encloses the body 20 of pyrotechnic material. One end of the housing 92 is disposed adjacent the igniter holder 72 and has a threaded, interior circumferential surface. The threaded surface of the housing 92 engages a threaded, exterior circumferential surface on the igniter holder 72 to mount the housing on the inner end of the igniter holder. The housing 92 is coaxial with the chamber 86 and the igniter assembly 22 in the igniter holder 72.

Figure 3:
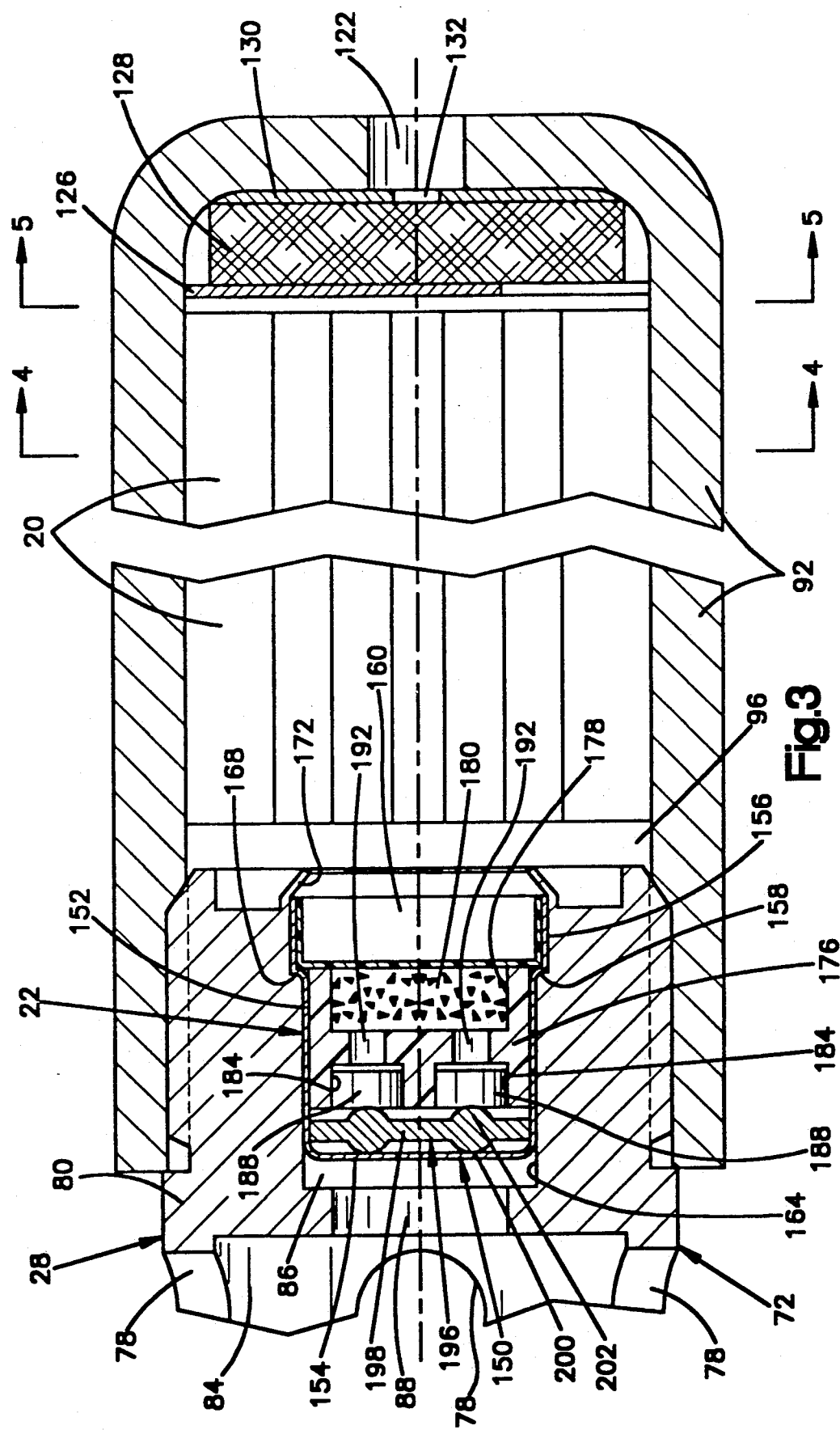
FIG. 3 is an enlarged fragmentary sectional view, on a somewhat larger scale than FIG. 2, of another portion of the inflator assembly of FIG. 1.

The body 20 of pyrotechnic material is disposed in a cylindrical chamber 96 within the housing 92 (FIG. 3). The housing 92 supports the body 20 of pyrotechnic material in a coaxial relationship with the igniter assembly 22. The coaxial relationship facilitates ignition of the body 20 of pyrotechnic material upon actuation of the igniter assembly 22.

Figure 4:
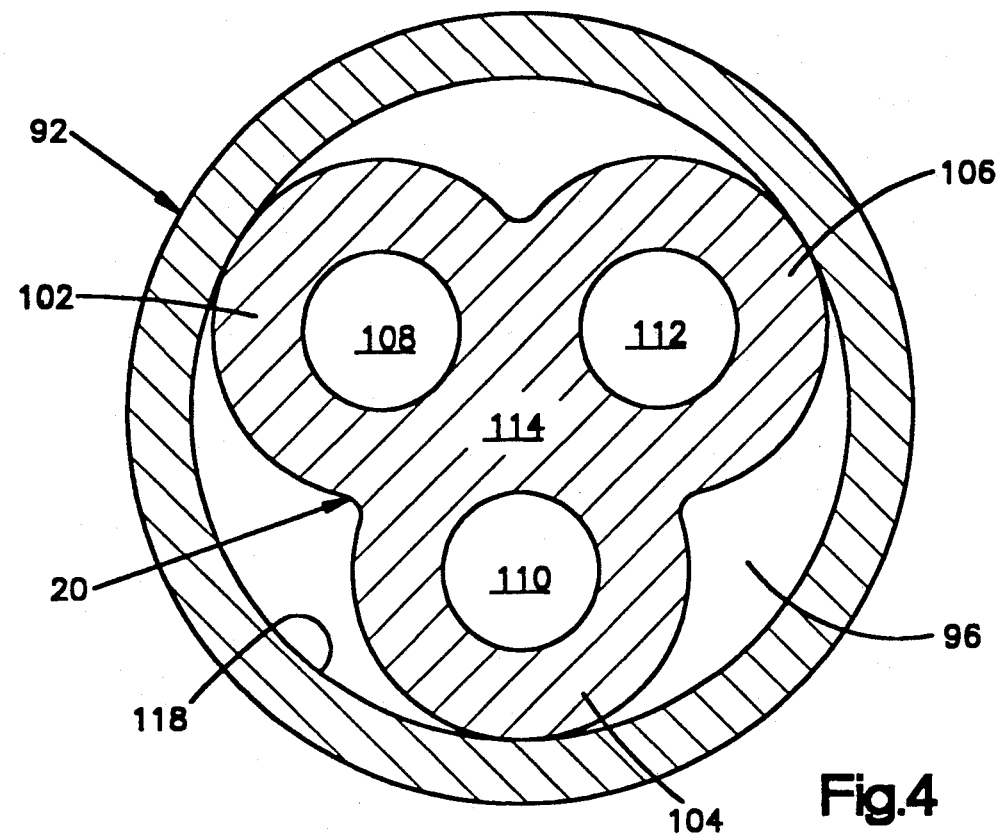
FIG. 4 is a sectional view, taken approximately along the line 4—4 of FIG. 3.

The body 20 of pyrotechnic material has a three-lobed cross sectional configuration (FIG. 4). Specifically, the body 20 of pyrotechnic material has lobes 102, 104 and 106 which extend throughout the axial extent of the body of pyrotechnic material. Straight cylindrical passages 108, 110 and 112 extend parallel to each other and axially through respective lobes 102, 104, and 106 in the body 20 of pyrotechnic material. The lobes 102, 104, 106 and passages 108, 110, 112 are disposed in a circular array about a solid central portion 114 of the body 20 of pyrotechnic material. The lobes 102, 104, 106 of the body 20 of pyrotechnic material have an interference fit with a cylindrical inner side surface 118 of the housing 92 to support the body 20 of pyrotechnic material firmly in the cylindrical housing chamber 96.

By providing the body 20 of pyrotechnic material with the internal passages 108, 110 and 112, the body 20 of pyrotechnic material will have a slightly progressive burn characteristic. Specifically, as the body 20 of pyrotechnic material is burned, the rate of generation of heat and gas slightly increases. This is because, as the body 20 of pyrotechnic material burns, the total surface area of the body which is burning increases slightly. The area of the outer side surface of the body 20 of pyrotechnic material decreases while the area of the surfaces of the passages 108-112 increases. The body 20 of pyrotechnic material could be configured to have different burning characteristics if desired.

At its end opposite from the manifold assembly 28 (FIG. 3), the housing 92 is substantially closed except for a circular orifice 122. The orifice 122 is disposed in a coaxial relationship with the housing chamber 96 and igniter assembly 22. The orifice 122 connects the inside of the housing chamber 96 in fluid communication with the chamber 14 in the container 12 (FIG. 1). The orifice 122 is continuously open so that the gas which is stored in the chamber 14 can flow into the housing chamber 96 around the body 20 of pyrotechnic material.

Figure 5:
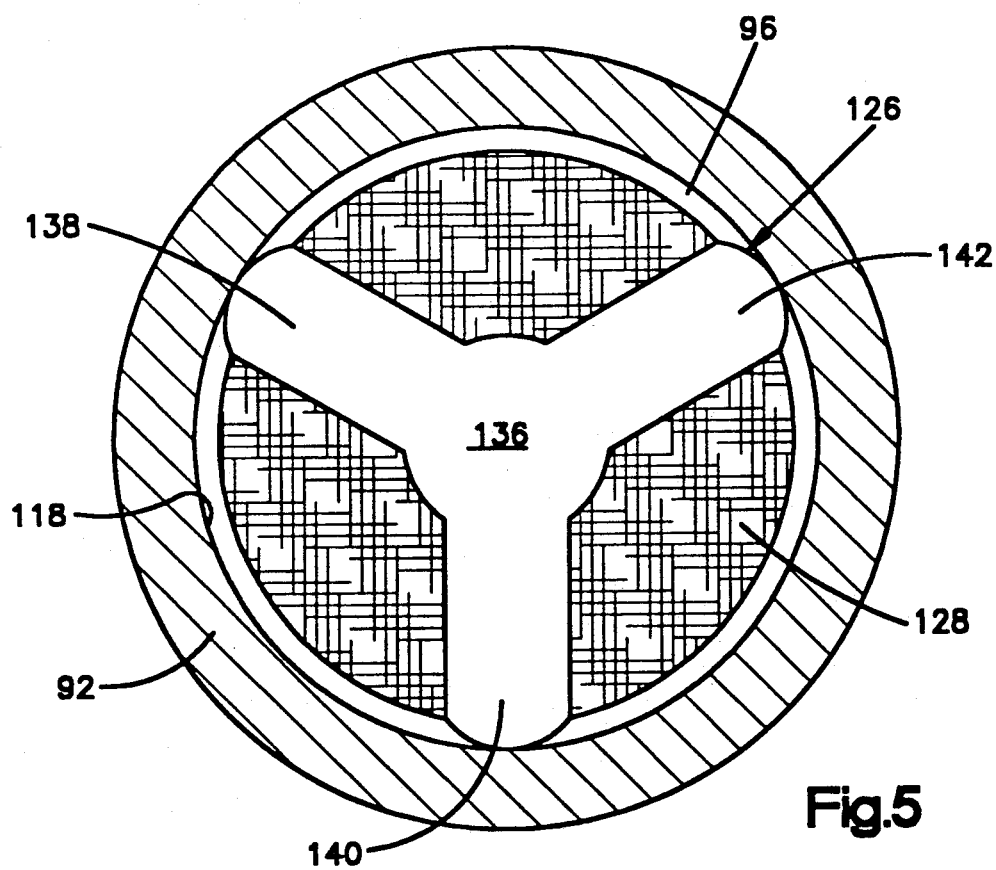
FIG. 5 is a sectional view, taken approximately along the line 5—5 of FIG. 3.

Disposed between the body 20 of pyrotechnic material and the orifice 122 are a flat baffler plate 126 (FIGS. 3 and 5), a circular screen 128, and a flat circular orifice plate 130. The baffler plate 126 is closest to the body 20 of pyrotechnic material. The baffler plate 126 includes three arms 138, 140, and 142 which extend radially outwardly from a central portion 136 of the baffler plate into engagement with the inner side surface 118 of the housing 92. The screen 128 engages the surface of the baffler plate 126 opposite the body 20 of pyrotechnic material. The orifice plate 130 is disposed between the screen 128 and the housing orifice 122.

The orifice plate 130 has a relatively small circular central orifice 132 which is disposed in a coaxial relationship with the housing orifice 122, baffler plate 126 and the body 20 of pyrotechnic material. The orifice 132 is smaller in diameter than the circular orifice 122 in the housing 92. The orifice plate 130 may be formed of carbon steel. The orifice plate may have a thickness of approximately 0.15 millimeters. The diameter of the orifice 132 in the plate 130 may be approximately two millimeters.

During burning of the body 20 of pyrotechnic material, a flow of combustion products from the pyrotechnic material impinges against the baffler plate 126. The baffler plate 126 provides a torturous path in the housing 92 for the combustion products, and thus some particles may be trapped in the housing 92. The combustion products after they pass the baffler plate 126 flow through the screen 128, the orifice 132 in the orifice plate 130 and the housing orifice 122 into the chamber 14. Also, during burning of the body 20 of pyrotechnic material, a flame is conducted through the orifice 132 in the orifice plate 130 and the housing orifice 122 into the chamber 14.

During initial burning of the pyrotechnic material 20, the opening 132 of relatively small area in the orifice plate 130 restricts the flow of combustion products from the housing chamber 96. This causes the pressure and temperature in the housing chamber 96 to increase in such a manner as to promote burning of the body 20 of pyrotechnic material.

As the body 20 of pyrotechnic material continues to burn, the flow of hot combustion products and flame through the orifice 132 in the orifice plate 130 heats the orifice plate and tends to melt the material of the orifice plate. The pressure applied by the hot combustion products against the orifice plate 130 deforms the orifice plate at the unsupported portion around the orifice hole to increase the diameter of the orifice 132 to the same diameter as the housing orifice 122. Specifically, the diameter of the orifice 132 may increase from two millimeters to about six millimeters. Thus, the area of opening 132 in the orifice plate 130 becomes approximately equal to the area of the housing orifice 122.

Although the body 20 of pyrotechnic material could have many different compositions, in one specific embodiment of the invention, the body of pyrotechnic material had the following composition:

| % By Weight | Ingredient |
| --- | --- |
| 73% | Potassium perchlorate |
| 8.7% | Dioctyl adipate |
| 6.6% | Polyvinyl chloride |
| 0.05% | Carbon Black |
| 0.15% | Stabilizers (Boron, Chromium) |
| 11.5% | Potassium nitrate |

Also, the body 20 of pyrotechnic material could have different sizes and shapes. In one specific embodiment, the body 20 of pyrotechnic material had a shape as shown in FIGS. 3 and 4, an axial length of 42 millimeters, and a weight of about 28 grams. The passages 108, 110, 112 had a diameter of about 6 millimeters, and the outer tips of the lobes 102, 104, 106 laid on a circle about 27 millimeters in diameter. This body 20 of pyrotechnic material had the foregoing composition. When the body was ignited it burned for approximately 44 milliseconds at a temperature of about 4,000° F. The length of time for which a body 20 of pyrotechnic material burns and the temperature which is obtained will depend upon the mass, shape and specific composition of the body 20 of pyrotechnic material.

Igniter Assembly

As previously described, the igniter assembly 22 is actuatable to ignite the body 20 of pyrotechnic material. The igniter assembly 22 has a sheet metal casing 150 (FIG. 3). The sheet metal casing 150 is relatively thin and is readily deformed. The sheet metal casing 150 has a cylindrical main section 152 which extends axially outwardly from a circular end wall 154. A cylindrical outer end section 156 of the casing 150 is connected with the main section 152 by a radially extending annular shoulder 158. A cylindrical end cap 160 extends into the outer end section and abuts the shoulder 158.

The cylindrical main section 152 of the igniter casing 150 engages a cylindrical inner surface 164 of the chamber 86 in the igniter holder 72. An annular flange 172 projecting from the igniter holder 72 is crimped over the outer end section 156 of the igniter casing 150 to hold the igniter assembly 22 in place in the chamber 86. The igniter casing shoulder 158 engages an annular shoulder 168 on the igniter holder 72 to help locate the igniter assembly 22 axially in the chamber 86 and to prevent the crimping operation from compressing the ignition materials in the igniter assembly.

The igniter assembly 22 includes a generally cylindrical base 176 which is formed of a metal or a polymeric material and is disposed within the casing 150. At one end, the base 176 has a cylindrical recess 178 in which an ignition material 180 is disposed. The ignition material 180 is preferably BKNO$_3$, but could have a different composition if desired. In one specific embodiment, the other end of the base 176 of the igniter assembly 22 has three cylindrical cavities 184 (only two of which are shown in FIG. 3) disposed in a circular array, although any number from one to a multiple could be used. Cylindrical primers 188 are disposed in the cavities 184. The cavities 184 communicate with the cavity 178 through cylindrical passages 192. Since the primers 188 are in parallel, each additional primer increases the reliability of deployment on demand.

A circular impact member 196 functions as a firing pin for the primers 188 and is disposed between the primers 188 and the end wall 154 of the casing 150. The impact member 196 includes a circular plate 198 with axially projecting annular rings 200 and 202. The axially projecting ring 200 engages the circular end wall 154 of the casing 150. The axially projecting ring 202 abuts each of the primers 188.

Upon movement of the plate 198 toward the primers 188, all of the primers are simultaneously actuated. Upon ignition or detonation of the primers 188, heat and flame are conducted to the ignition material 180 through the passage 192 to ignite the ignition material. The ignition material 180, in turn, rapidly burns at a relatively high temperature to generate heat and flame which initiate burning of the body 20 of pyrotechnic material. The igniter assembly 22 is manufactured by Special Devices Incorporated of Los Angeles, Calif.

Actuator Assembly

The actuator assembly 24 (FIG. 2) is operable to rupture the burst disk 26 and to actuate the igniter assembly 22. The actuator assembly 24 includes a cylindrical housing 208 in which an actuator member 210 and pyrotechnic charge 212 ar disposed in a coaxial relationship. The housing 208 includes a generally cylindrical metal outer housing member 216, a cylindrical casing 220, and an inner housing member 222. The outer housing member 216 is secured to the end wall 68 of the manifold plug 56 and is disposed in a coaxial relationship with the burst disk 26, the igniter assembly 22 and the body 20 of pyrotechnic material. The casing 220 is disposed within the outer housing member 216 and extends around the cylindrical metal inner housing member 222. The casing 220 is formed of glass reinforced nylon in this case. However, the casing 220 may be made of a variety of engineered resins. The casing 220 electrically insulates the metal inner housing member 222 from the metal outer housing member 216.

The inner housing member 222 forms a cylinder chamber 226 in which the actuator member 210 and the pyrotechnic charge 212 are disposed. The inner housing member 222 has an annular end flange 228 which defines a circular opening 230 to the cylinder chamber 226. The circular opening 230 is blocked by a cylindrical end cap 232 formed by a thin layer of plastic film. The end cap 232 extends across the end flange 228 and the opening 230 and along the cylindrical outer side surface of the inner housing member 222. The end cap 232 electrically insulates the outer end portion of the metal inner housing member 222 and closes the opening 230.

The actuator member 210 is formed from a single piece of metal. The actuator member 210 includes a cylindrical head end portion 236 from which a cylindrical rod portion 238 extends. The cylindrical rod portion 238 has a pointed tip. The rod portion 238 is disposed in a coaxial relationship with the circular opening 230 at the end of the inner housing member 222 and with the opening 60 and burst disk 26. An annular O-ring 240 is disposed on the head end portion 236 and engages and seals against a cylindrical inner side surface 242 of the inner housing member 222. Together, the head end portion 236 and the O-ring 240 cooperate to divide the outer chamber 226 into a rod end portion 244 and a head end portion 246.

The pyrotechnic charge 212 is disposed in the head end portion 246 of the cylinder chamber 226. The portion of the pyrotechnic charge 212 generally opposite the head end portion 236 of the actuator member 210 contacts an electrically conductive resistance wire (not shown). The resistance wire is connected to the adjacent ends of two electrically conductive pins 252 and 254. The pins 252 and 254 extend out of the cylinder chamber 226, through the casing 220, and through an opening in the end of the outer housing member 216 adjacent the wall 68. The pins 252 and 254 provide a path for electrical current to heat the resistance wire and ignite the pyrotechnic charge 212. The pyrotechnic charge 212 may be zirconium potassium perchlorate or BKNO$_3$ or, if desired, a different chemical composition.

Operation

Upon the occurrence of sudden vehicle deceleration, a deceleration sensor (not shown) of known construction completes an electrical circuit to permit electrical current to flow to the pins 252 and 254 of the actuator assembly 24. The electrical current transmitted to the pins 252 and 254 causes the resistance wire to heat up and thereby ignite the pyrotechnic charge 212. The gas generated by burning of the pyrotechnic charge 212 pushes against the head end portion 236 of the actuator member 210 to move the actuator member in the cylinder chamber 226. Movement of the actuator member 210 causes its rod end portion to move through the circular opening 230 and pierce the end cap 232. The tip of the rod end portion 238 of the actuator member 210 strikes at or near the center of the burst disk 26. The force applied against the burst disk 26 by the pointy tip on the actuator member 210 ruptures the burst disk. The fluid pressure in the container 12 then deforms the burst disk 26 axially outwardly as the stored gas escapes from the chamber 14.

The unheated gas in the container chamber 14 flows from the chamber through the manifold inlet openings 78 to the chamber 84 in the igniter holder 72. The gas then flows through the opening in the burst disk 26 around the rod end portion 238 of the actuator member 210, and into the cavity 58 in the manifold plug 56. The gas then flows from the manifold plug cavity 58 through the openings 62 into the diffuser chamber 30. The gas flows from the diffuser chamber 30 through the openings 34 to an air bag.

After rupturing the burst disk 26, the actuator member 210 continues to move axially under the influence of the pyrotechnic charge 212. The leading end of the actuator member strikes the end wall 154 of the casing 150 (FIG. 3) of the igniter assembly 22. The impact force applied by the actuator member 210 against the casing 150 moves the impact member 196 toward the primers 188. The impact force applied by the annular ring 202 (FIG. 3) of the impact member 196 against the primers 188 simultaneously actuates all three primers.

Actuation of the primers 188 results in the ignition material 180 being ignited. If for some unforeseen reason, one of the primers 188 should fail to actuate, the other primers are sufficient to cause the ignition material 180 to ignite. In fact, actuation of only one of the primers 188 is sufficient to ignite the ignition material 180. Upon being ignited, the ignition material 180 burns very rapidly to form hot combustion products. These combustion products flow toward and ignite the body 20 of pyrotechnic material. When the body 20 of pyrotechnic material initially begins to burn, the orifice disk 130 restricts fluid flow from the housing chamber 96 so that the temperature and pressure in the housing chamber increase. The increased temperature and pressure in the housing chamber 96 promotes burning of the body 20 of pyrotechnic material.

As the body 20 of pyrotechnic material begins to burn, hot combustion products and flame flow around the baffle plate 126, through the screen 128, through the orifice 132, and through the housing orifice 122 into the chamber 14 containing the stored gas. During burning of the body 20 of pyrotechnic material, the temperature in the chamber 96 reaches approximately 4,000° F. This relatively high temperature is more than sufficient to enable the hot combustion products and flame to partially melt the orifice plate 130 and increase the diameter of the orifice 132 to the same diameter as the housing orifice 122.

The flame and hot combustion products heat the gas in the chamber 14. As the gas in the chamber 14 is heated, fluid pressure in the chamber increases. This results in an increased rate of flow of gas through the manifold assembly 28 to the diffuser 32 and from the diffuser 32 into the inflatable occupant restraint.

In one specific embodiment of the invention, prior to operation of the actuator assembly 24, the fluid pressure in the chamber 14 was approximately 3,000 psi. Upon rupturing of the burst disk 26 by the actuator member 210, a flow of unheated gas from the chamber 14 caused the fluid pressure in the container 12 to decrease to approximately 2,500 psi. Actuation of the igniter assembly 22 and burning of the body 20 of pyrotechnic material resulted in the gas in the chamber 14 being heated to increase the pressure in the chamber to about 6,000 psi. Thus, the burning of the body 20 of pyrotechnic material was sufficient to cause the fluid pressure in the chamber 14 to increase substantially from its original pressure even though a portion of the gas had been released from the chamber. This results in a relatively large flow of gas to expand the occupant restraint.

First Modified Embodiment

Figure 8:
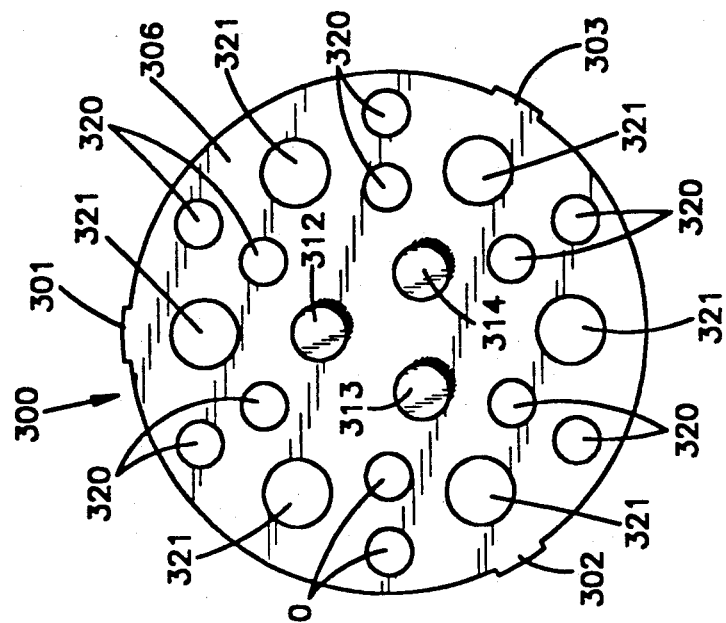
FIG. 8 is a view taken along line 8—8 of FIG. 6 with parts removed.
Figure 7:
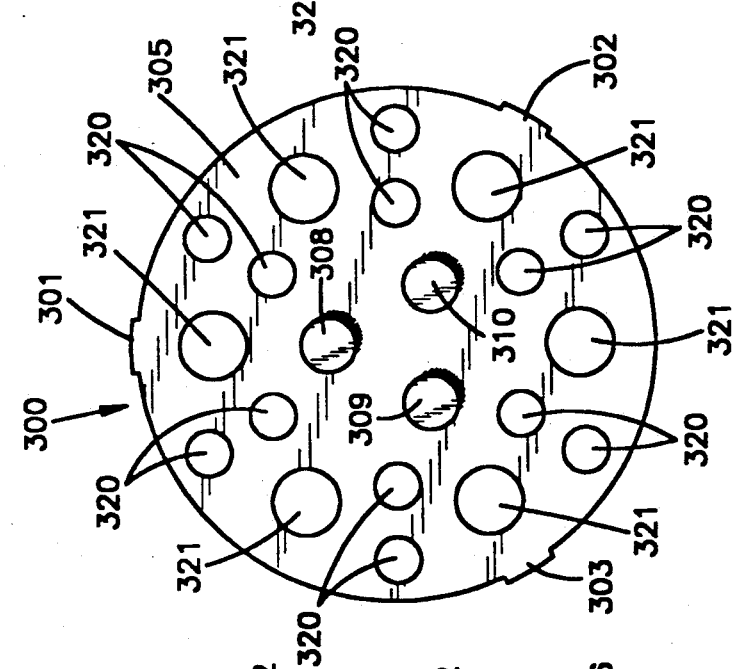
FIG. 7 is a view taken along line 7—7 of FIG. 6 with parts removed.
Figure 6:
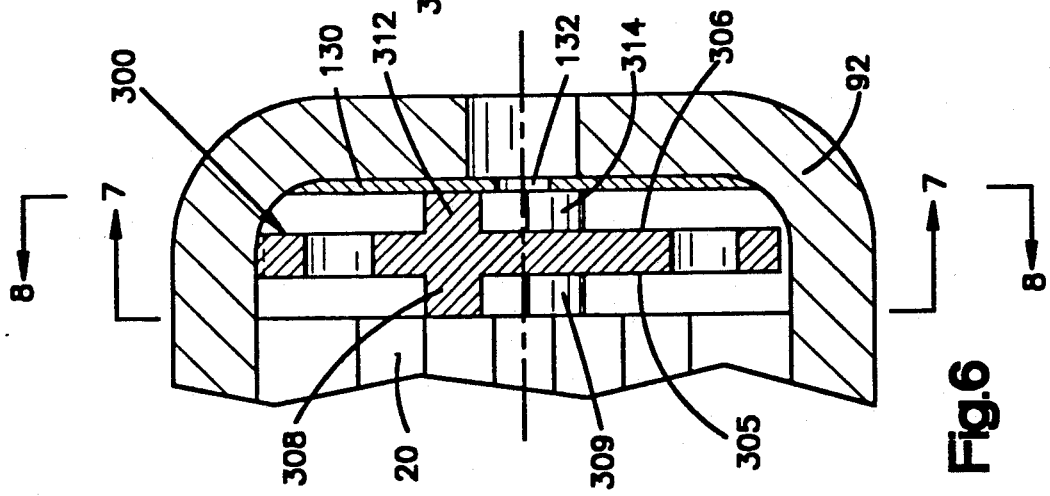
FIG. 6 is a fragmentary view of a modified embodiment of an inflator assembly constructed in accordance with the present invention.

FIGS. 6-8 illustrate a modified embodiment of the present invention. In the embodiment of FIGS. 6-8, a strainer 300 is used instead of the baffle plate 126 and screen 128. The strainer 300 is a powdered metal circular part located in the housing 92 between the body 20 of pyrotechnic material and the orifice plate 130.

The strainer 300, as best shown in FIGS. 7 and 8, has three projections 301, 302, and 303 extending from its outer periphery. These projections are press fit into the housing 92 and secure the strainer 300 in position. Due to the projections 301, 302, and 303, there is space between a substantial portion of the outer perimeter of the strainer 300 and the inner surface of the housing 92.

The strainer 300 also has a pair of opposed circular surfaces 305, 306 which extend transverse to the axis of housing 92. Three projections 308, 309, 310 extend axially from the surface 305. Three projections 312, 313, 314 also extend axially from the surface 306. The projections 308, 309, 310, 312, 313, and 314 are cylindrical in configuration, about the same axial length and about the same diameter. These projections ensure that a space exists between the surface 306 and the orifice plate 130.

The strainer 300 also has a series of passages 320, 321 axially extending between and intersecting the surfaces 305, 306. The passages 320, 321 are all circular. However, the passages 321 have a larger diameter than the passages 320. The number and size of the passages can be varied, if desired. There are twelve (12) passages 320. There are six (6) passages 321. The pattern of the passages is such as to provide an optimized strength to flow pattern relationship.

When the body 20 of pyrotechnic material burns, combustion products and flame encounter the strainer 300 and must flow through a torturous path before exiting through the housing orifice 122. Therefore, particles may trapped in the housing 92. Thus, the possibility of the orifice 122 plugging is minimized.

Second Modified Embodiment

Figure 9:
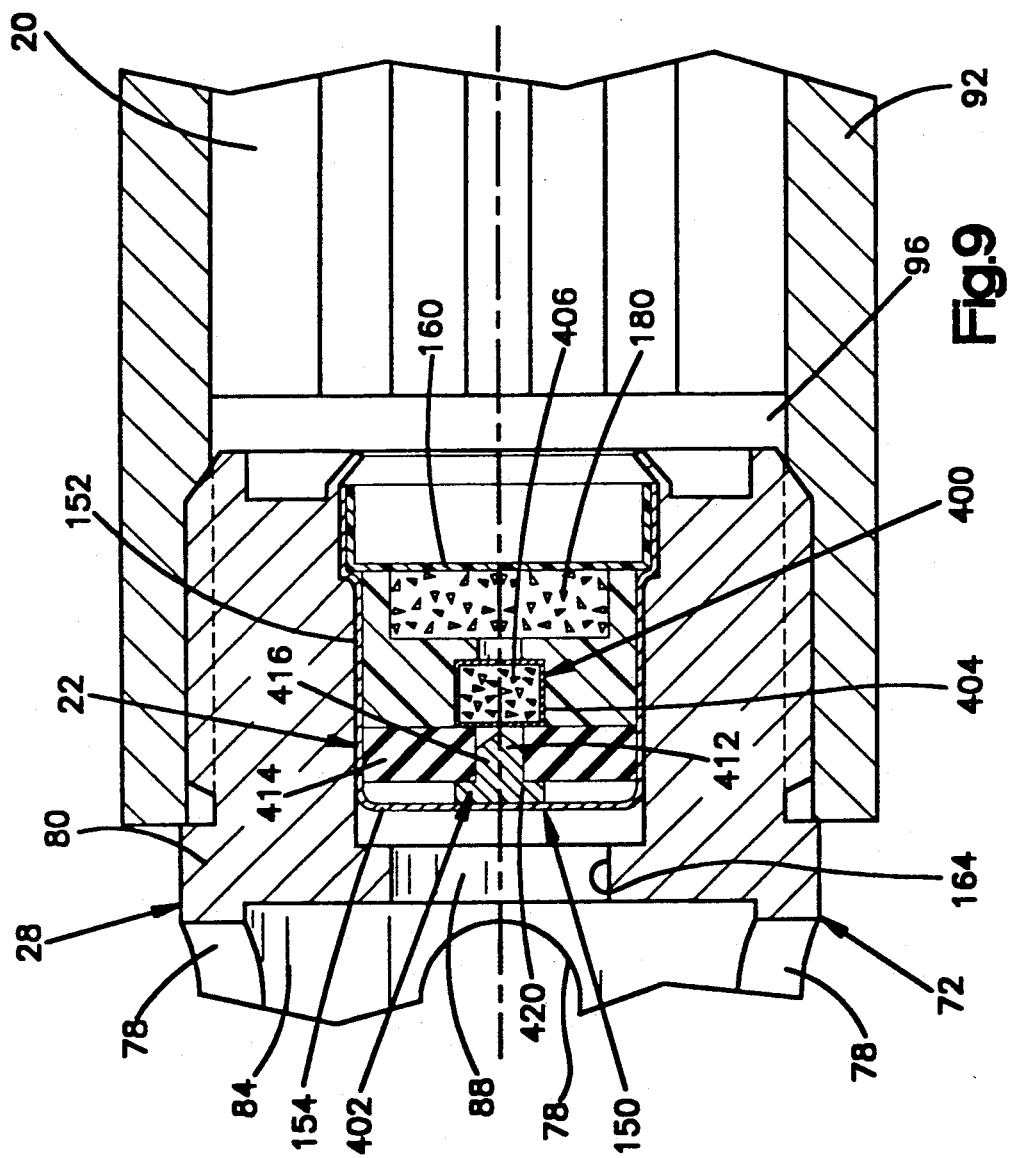

In the embodiment of the invention illustrated in FIG. 9, the igniter assembly 22 has a different construction than the igniter assembly 22 in the embodiment of FIGS. 1-5. The igniter assembly 22 of FIG. 9 has many parts which are similar to parts of the igniter assembly of FIGS. 1-5 and the similar parts are given the same reference numbers.

The igniter assembly 22 of the embodiment of the invention illustrated in FIG. 9, includes a primer 400 and a firing pin member 402. The primer 400 includes a sheet metal container 404 which holds primer material 406. The primer material 406 could be any suitable material. Preferably, the primer material 406 is a mixture of NOL (Naval Ordinance Labs Powder) 130, antimony trisulfide, silica, and potassium perchlorate. The primer material 406 is a product of Special Devices Incorporated of Los Angeles, Calif.

An annular rubber retainer 414 extends around a cylindrical shank portion 416 of the firing pin member 402. The retainer 414 supports the firing pin member 402 with a pointed end 412 of the firing pin member adjacent the container 404 and with a circular head portion 420 of the firing pin member 402 in abutting engagement with the circular end wall 154 of the casing 150. In one specific embodiment, the rubber retainer 414 had a Shore A hardness of approximately 80. The rubber retainer 414 could have a different hardness if desired.

When the actuator member 210 strikes the circular end wall 154 of the casing 150, the circular end wall of the casing is deflected toward the right (as viewed in FIG. 9) to force the firing pin member 402 to pierce the container 404 and contact the primer material 406. The rubber retainer 414 compresses to allow the firing pin to penetrate the container 404. As the pointed end 412 of the firing pin member 402 moves into the primer material 406, the primer material is ignited due to the frictional contact between the primer material and the firing pin member 402. Upon ignition of the primer material 406, the right (as viewed in FIG. 9) end of the container 404 ruptures and the primer material 406 ignites the ignition material 180. The ignition material 180 rapidly burns to generate heat and flame which initiates burning of the body 20 of pyrotechnic material in the manner explained above in connection with the embodiment of FIGS. 1–5.

The circular end wall 154 of the sheet metal casing 150 is not ruptured by the actuator member 210. Thus, the sheet metal housing remains intact and blocks any flow of gas from the igniter assembly 22 and body 20 of pyrotechnic material toward the left (as viewed in FIG. 9) through the circular opening 88.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for inflating a vehicle occupant restraint, said apparatus comprising:
   container means for storing gas under pressure;
   a body of ignitable material within said container means;
   igniter means for igniting said body of ignitable material; and
   actuator means for releasing the stored gas from said container means and for actuating said igniter means to ignite said body of ignitable material, said actuator means including,
   an actuator member movable along a path to establish a flow of stored gas from said container means and to actuate said igniter means to ignite said body of ignitable material, and
   means for moving said actuator member along said path.

2. An apparatus as set forth in claim 1 wherein said actuator member ruptures a portion of said container means to release the stored gas from said container means as said actuator member moves along said path.

3. An apparatus as set forth in claim 1 wherein said igniter means is operable in response to being struck to ignite said body of ignitable material, said actuator member striking said igniter means as said actuator member moves along said path thereby to effect actuation of said igniter means to ignite said body of ignitable material.

4. An apparatus as set forth in claim 3 wherein said actuator member ruptures a portion of said container means to release the stored gas prior to striking said igniter means.

5. An apparatus as set forth in claim 1 wherein said body of ignitable material includes means for generating heat to heat the gas in said container means upon ignition of said body of ignitable material.

6. An apparatus as set forth in claim 1 wherein said means for moving said actuator member along said path includes a pyrotechnic charge and means for igniting said pyrotechnic charge.

7. An apparatus as set forth in claim 1 wherein said actuator means includes a cylinder, said actuator member being at least partially disposed in said cylinder and cooperating with said cylinder to form a chamber, said means for moving said actuator member including a pyrotechnic charge disposed in the chamber, said pyrotechnic charge being ignitable to generate a pressure in the chamber to propel said actuator member along said path toward said igniter means.

8. An apparatus as set forth in claim 1 wherein said igniter means includes ignition material which is ignitable to initiate burning of said body of ignitable material, a plurality of primer elements which are actuatable in response to being struck to ignite said ignition material, and an impact member disposed adjacent to said plurality of primer elements, said impact member being movable relative to said plurality of primer elements by said actuator member to effect actuation of said plurality of primer elements.

9. An apparatus as set forth in claim 1 wherein said container means includes means for defining an opening through which gas flows from said container means, said actuator member being movable through the opening into engagement with said igniter means to actuate said igniter means.

10. An apparatus as set forth in claim 1 further including housing means connected with said container means and enclosing said body of ignitable material, said housing means including means for defining an opening through which flame is directed into the stored gas in said container means during burning of the ignitable material.

11. An apparatus as set forth in claim 1 wherein said container means stores gas at a first pressure prior to operation of said actuator means to establish a flow of the stored gas from said container means, said actuator means being operable to enable a portion of the stored gas to flow from said container means prior to ignitable of said body of ignitable material with a resulting reduction in the pressure in said container means from the first pressure to a second pressure which is less than the first pressure, said body of ignitable material being effective to heat the gas in said container means to increase the pressure in said container means to a third pressure which is greater than the first pressure during burning of said body of ignitable material after ignition of said body at ignitable material by said igniter means.

12. An apparatus as set forth in claim 1 further including housing means for enclosing said body of ignitable material, said housing means including an end portion having surface means for defining a first orifice having a first area, an orifice plate disposed in said housing means adjacent to said end portion of said housing means and having a second orifice with a second area which is smaller than the first area, said first and second orifices conducting a flow of combustion products from said housing means during burning of said body of ignitable material, said orifice plate being deformable by the flow of combustion products to increase the size of said second orifice from the first area to an area which is at least approximately as great as the second area.

13. An apparatus for inflating a vehicle occupant restraint, said apparatus comprising:
   container means for storing gas under pressure;
   means for heating the stored gas, said means for heating the stored gas including a body of ignitable material which burns to produce heat;
   igniter means actuatable in response to being struck to ignite said body of ignitable material;
   actuator means for actuating said igniter means to ignite said body of ignitable material, said actuator means including,
   an actuator member which is movable to strike said igniter means and thereby actuate said igniter means to ignite said body of ignitable material and means for moving said actuator member.

14. An apparatus as set forth in claim 13 wherein said igniter means includes a plurality of primer elements which are actuatable in response to the application of force against said primer elements to effect ignition of said body of ignitable material, an impact member which is movable to apply force against said plurality of primer elements, said impact member being movable by said actuator member to apply force against said plurality of primer elements to effect actuation of said plurality of primer elements.

15. An apparatus as set forth in claim 14 wherein said impact member includes a plate with an annular projection from at least one side of said plate, said annular projection being disposed in abutting engagement with said plurality of primer elements.

16. An apparatus as set forth in claim 13 wherein said body of ignitable material and said igniter means are disposed within said container means, said actuator member being movable into said container means from a location outside of said container means to strike said igniter means.

17. An apparatus as set froth in claim 16 wherein said container means includes a burst disk which is rupturable upon movement of said actuator member into said container means to release the stored gas in said container means.

18. An apparatus as set forth in claim 13 further including housing means enclosing said body of ignitable material, said housing means including surface means for directing a flame into the stored gas in said container means to heat the stored gas during burning of said body of ignitable material.

19. An apparatus as set forth in claim 13 further including housing means for enclosing said body of ignitable material, said housing means including an end portion having surface means for defining a first orifice having a first area, an orifice plate disposed in said housing means adjacent to said end portion of said housing means and having a second orifice with a second area which is smaller than the first area, said first and second orifices conducting a flow of combustion products from said housing means during burning of said body of ignitable material, said orifice plate being deformable by the flow of combustion products to increase the size of said second orifice from the second area to an area which is at least approximately as great as the first area.

20. An apparatus for inflating a vehicle occupant restraint, said apparatus comprising:
container means for storing gas under pressure;
a body of ignitable material connected with said container means;
igniter means actuatable in response to being struck to ignite said body of ignitable material; and
actuator means for releasing the stored gas from said container means and for actuating said igniter means to ignite said body of ignitable material, said actuator means including an actuator member, and pyrotechnic means for moving said actuator member to rupture a portion of said container means and to strike said igniter means.

21. An apparatus as set forth in claim 20 wherein said igniter means and said body of ignitable material are disposed in said container means, at least a portion of said actuator member being movable from a location outside of said container means into said container means to rupture a portion of said container means and to strike said igniter means.

22. An apparatus as set forth in claim 20 wherein said container means includes wall means which at least partially defines an orifice and a burst disk which extends across the orifice to block a flow of gas from said container means, at least a portion of said actuator member being movable through said orifice to rupture said burst disk and release the stored gas from said container means.

23. An apparatus as set forth in claim 22 wherein said igniter means is disposed in alignment with the orifice and a leading end portion of said actuator member strikes said igniter mean after movement of the leading end portion of said actuator member through said burst disk.

24. An apparatus as set forth in claim 20 wherein said container means includes a wall which at least partially defines a chamber for holding the stored gas, a hollow manifold which extends through and is connected with said wall, said manifold having an inner portion which is at least partially disposed in the chamber and an opening connecting an interior portion of said manifold in fluid communication with the chamber, said manifold having an outer portion which is at least partially disposed outside of the chamber and having an opening connecting the interior portion of said manifold in fluid communication with the outside of said manifold, and a burst disk disposed in the interior portion of said manifold between the inner and outer portions of said manifold, said igniter means being connected with the inner portion of said manifold, said actuator means being connected with the outer portion of said manifold, at least an end portion of said actuator member being movable through said burst disk into engagement with said igniter means upon movement of said actuator member by said pyrotechnic means.

25. An apparatus as set forth in claim 24 further including housing means for enclosing said body of ignitable material, said housing means being connected with said igniter means which is connected to said inner portion of said manifold, said housing means including surface means for directing a flow of combustion products from said housing means into the chamber in a direction away from said manifold upon burning of said body of ignitable material.

26. An apparatus as set forth in claim 20 further including housing means for enclosing said body of ignitable material, said housing means including an end portion having surface means for defining a first orifice having a first area, an orifice plate disposed in said housing means adjacent to said end portion of said housing means and having a second orifice with a second area which is smaller than the first area, said first and second orifices conducting a flow of combustion products from said housing means during burning of said body of ignitable material, said orifice plate being deformable by the flow of combustion products to increase the size of said second orifice form the second area to an area which is at least approximately as great s the first area.

27. An apparatus for inflating a vehicle occupant restraint, said apparatus comprising:
container means for storing gas under pressure;
a body of ignitable material within said container means;
housing means at least partially disposed within said container means for enclosing said body of ignitable material, said housing means including an end portion having surface means for defining a first orifice having a first area;

igniter means for igniting said body of ignitable material to initiate burning of said body of ignitable material; and an orifice plate disposed in said housing means between said body of ignitable material and said end portion of said housing means, said orifice plate having surface means for defining a second orifice with a second area which is smaller than the first area to restrict a flow of combustion products from said housing means upon initiation of burning of said body of ignitable material, said first and second orifices conducting a flow of combustion products from said housing means during burning of said body of ignitable material, said orifice plate being deformable by the flow of combustion products to increase the size of said second orifice from the second area to an area which is at least approximately as great as the first area to reduce the extent to which said orifice plate restricts the flow of combustion products from said housing means.

28. An apparatus as set forth in claim 27 further including actuator means for releasing the stored gas from said container means and for actuating said igniter means to ignite said body of ignitable material, said actuator means including an actuator member movable along a path to establish a flow of stored gas from said container means and to actuate said igniter means to ignite said body of ignitable material, and means for moving said actuator member along said path.

29. An apparatus as set forth in claim 27 wherein said igniter means is actuatable in response to being struck to ignite said body of ignitable material, said apparatus further including actuator means for actuating said igniter means to ignite said body of ignitable material, said actuator means including an actuator member which is movable to strike said igniter means and thereby actuate said igniter means to ignite said body of ignitable material, and means for moving said actuator member.

30. An apparatus as set forth in claim 27 wherein said igniter means is actuatable in response to being struck to ignite said body of ignitable material, said apparatus further including actuator means for releasing the stored gas from said container means and for actuating said igniter means to ignite said body of ignitable material, said actuator means including an actuator member, and pyrotechnic means for moving said actuator member to rupture a portion of said container means and to strike said igniter means.

31. An apparatus for inflating a vehicle occupant restraint, said apparatus comprising:

container means having a chamber for storing gas under pressure;

a body of ignitable material associated with said container means and which, when ignited, heats said stored gas;

igniter means for igniting said body of ignitable material;

an assembly connected with said container, said assembly including an igniter holder for supporting said igniter means, a manifold member having passage means for directing stored gas from said chamber, and a burst disk closing said passage means; and means for rupturing said burst disk to enable gas to flow through said passage means and for actuating said igniter means to ignite said body of ignitable material.

32. An apparatus as defined in claim 31 wherein said burst disk has a flange portion which projects between said igniter holder and manifold member and which is welded to said igniter holder and manifold member.

33. An apparatus as defined in claim 31 wherein said igniter holder has a chamber portion in fluid communication with said chamber of said container means and said burst disk blocks fluid communication between said chamber portion and said passage means.

34. An apparatus for inflating a vehicle occupant restraint, said apparatus comprising:

container means for storing gas under pressure, said container means including a side wall and having a first opening at a first end portion of said side wall;

housing means for holding a body of ignitable material within said container means; and a first friction weld interconnecting said housing means and the first end portion of said side wall of said container means.

35. An apparatus as set forth in claim 34 wherein said container means has a second opening at a second end portion of said side wall, plug means for blocking the second opening at the second end portion of said side wall, and a second friction weld interconnecting said plug means and the second end portion of said side wall.

36. An apparatus as set forth in claim 34 wherein said housing means includes a first housing section and a second housing section, said first and second housing sections having passage means for conducting a flow of fluid from said container means, and a burst disk closing said passage means, said apparatus further including actuator means for rupturing said burst disk to enable gas to flow through said passage means.

37. An apparatus as set forth in claim 34 wherein said housing means includes a first section for holding the body of ignitable material in said container means, a second section at least partially disposed outside of said container means, and a burst disk between said first and second housing sections, said apparatus further including actuator means at least partially disposed in said second section of said housing means for rupturing said burst disk to enable gas to flow from said container means and for effecting ignition of the body of ignitable material, said actuator means including an actuator member having an end portion which is movable from said second housing section through said burst disk into said first housing section and pyrotechnic means at least partially disposed in said second housing section for moving said actuator member.

38. An apparatus as set forth in claim 37 wherein said first friction weld interconnects said first end portion of said side wall and said second housing section.

* * * * *

UNITED STATES PATENT AND TRADEMARK OFFICE
CERTIFICATE OF CORRECTION

PATENT NO. : 5,131,680

DATED : July 21, 1992

INVENTOR(S) : Terry Coultas, Paul Wipasuramonton, James R. Hocking

It is certified that error appears in the above-identified patent and that said Letters Patent is hereby corrected as shown below:

Column 12, Line 31, Claim 11, change "ignitable" to --ignition--

Column 12, Line 40, Claim 11, change "at" to --of--.

Column 13, Line 25, Claim 17, change "froth" to --forth--.

Column 14, Line 59, Claim 26, change "form" to --from--.

Column 14, Line 60, Claim 26, change "s" to --as--.

Signed and Sealed this

Twenty-fourth Day of August, 1993

Attest:

BRUCE LEHMAN

*Attesting Officer*     *Commissioner of Patents and Trademarks*